United States Patent
Inoue (10) Patent No.: US 9,089,118 B2
(45) Date of Patent: Jul. 28, 2015

(54) DRIVE GEAR

(71) Applicant: Shimano Inc., Sakai, Osaka (JP)

(72) Inventor: Tetsuo Inoue, Osaka (JP)

(73) Assignee: Shimano Inc., Osaka (JP)

( * ) Notice: Subject to any disclaimer, the term of this patent is extended or adjusted under 35 U.S.C. 154(b) by 52 days.

(21) Appl. No.: 13/948,533

(22) Filed: Jul. 23, 2013

(65) Prior Publication Data

US 2014/0084096 A1 Mar. 27, 2014

(30) Foreign Application Priority Data

Sep. 25, 2012 (JP) ................................ 2012-210574

(51) Int. Cl.
*A01K 89/00* (2006.01)
*F16H 55/08* (2006.01)

(52) U.S. Cl.
CPC ................ *A01K 89/00* (2013.01); *F16H 55/08* (2013.01)

(58) Field of Classification Search
USPC .......................................... 242/255, 263, 249
See application file for complete search history.

(56) References Cited

U.S. PATENT DOCUMENTS 2,761,327 A * 9/1956 Sawyer et al. ................... 74/443
5,255,475 A * 10/1993 Kotthaus ....................... 451/548

FOREIGN PATENT DOCUMENTS

| JP | 2002-233276 A | 8/2002 |
| JP | 2011-52782 A | 3/2011 |
| JP | 2012-120444 A | 6/2012 |

OTHER PUBLICATIONS

European Search Report of corresponding EP Application No. 13 18 0313.2 dated Jan. 8, 2014.

* cited by examiner

*Primary Examiner* — Emmanuel M Marcelo
(74) *Attorney, Agent, or Firm* — Global IP Counselors (57) ABSTRACT

A fishing reel drive gear is used for a fishing reel. The fishing reel drive gear is arranged to be meshed with a pinion gear. The fishing reel drive gear includes a gear tooth portion and a disc portion. The gear tooth portion has first and second gear teeth. The first gear tooth includes a first tooth surface. The second gear tooth includes a second tooth surface. The first tooth surface includes a first groove thereon. The second tooth surface includes a second groove thereon. The first and second grooves intersect with a mesh directional. The disc portion has an outer peripheral surface and a radially outer portion of a lateral face. The gear tooth portion is configured on the outer peripheral surface or the radially outer portion. The fishing reel drive gear is arranged to be meshed with the pinion gear in a direction of the mesh directional path.

7 Claims, 10 Drawing Sheets

DRIVE GEAR

CROSS-REFERENCE TO RELATED APPLICATIONS

This application claims priority to Japanese Patent Application No. 2012-210574 filed on Sep. 25, 2012. The entire disclosure of Japanese Patent Application No. 2012-210574 is hereby incorporated herein by reference.

BACKGROUND

1. Field of the Invention

The present invention relates to a drive gear, particularly to a drive gear to be used for a fishing reel.

2. Background Art

A drive gear is used for a fishing reel in order to transmit handle rotation. For example, a drive gear with helical teeth is used for a dual-bearing reel in order to transmit handle rotation to a spool. Further, a drive gear with face gear teeth is used for a spinning reel in order to transmit handle rotation to a rotor.

In a fishing reel, a drive gear is necessary to enhance rotational feeling. In other words, the drive gear is necessary to enable the handle to be smoothly rotated without inconstant rotation as much as possible.

A type of drive gear has been known that the number of gear teeth is increased for enhancing rotational feeling as described in Japan Laid-open Patent Application Publication No. JP-A-2012-120444. With increase in the number of gear teeth, frequency at which gear teeth mesh per rotation of the drive gear is increased. In other words, gear mesh frequency is increased. When gear mesh frequency is increased, rotational feeling is enhanced even when amplitude is the same. However, when the number of gear teeth is simply increased, a drive gear is increased in its diameter. As a result, a reel is increased in its size. In view of this, a well-known drive gear employs micro module gear teeth with a module of 0.35 for preventing increase in its size.

SUMMARY

When the number of gear teeth of a drive gear is increased by reducing the module of the gear teeth for preventing increase in a diameter of the drive gear, each gear tooth is reduced in its size and chances are that the drive gear is degraded in its strength unless being appropriately designed.

It is an advantage of the present invention to enhance rotational feeling of a drive gear without increase in diameter of the drive gear and without degradation in strength of the drive gear.

A fishing reel drive gear is used for a fishing reel. The fishing reel drive gear is arranged to be meshed with a pinion gear. The fishing reel drive gear includes a gear tooth portion and a disc portion. The gear tooth portion has first and second gear teeth. The first gear tooth includes a first tooth surface. The second gear tooth includes a second tooth surface. The first tooth surface includes a first groove thereon. The second tooth surface includes a second groove thereon. The first and second grooves intersect with a mesh directional. The disc portion has an outer peripheral surface and a radially outer portion of a lateral face. The gear tooth portion is configured on the outer peripheral surface or the radially outer portion. The fishing reel drive gear is arranged to be meshed with the pinion gear in a direction of the mesh directional path.

BRIEF DESCRIPTION OF THE DRAWINGS

Referring now to the attached drawings which form a part of this original disclosure.

DETAILED DESCRIPTION OF THE PREFERRED EMBODIMENTS

First Exemplary Embodiment

Figure 1:
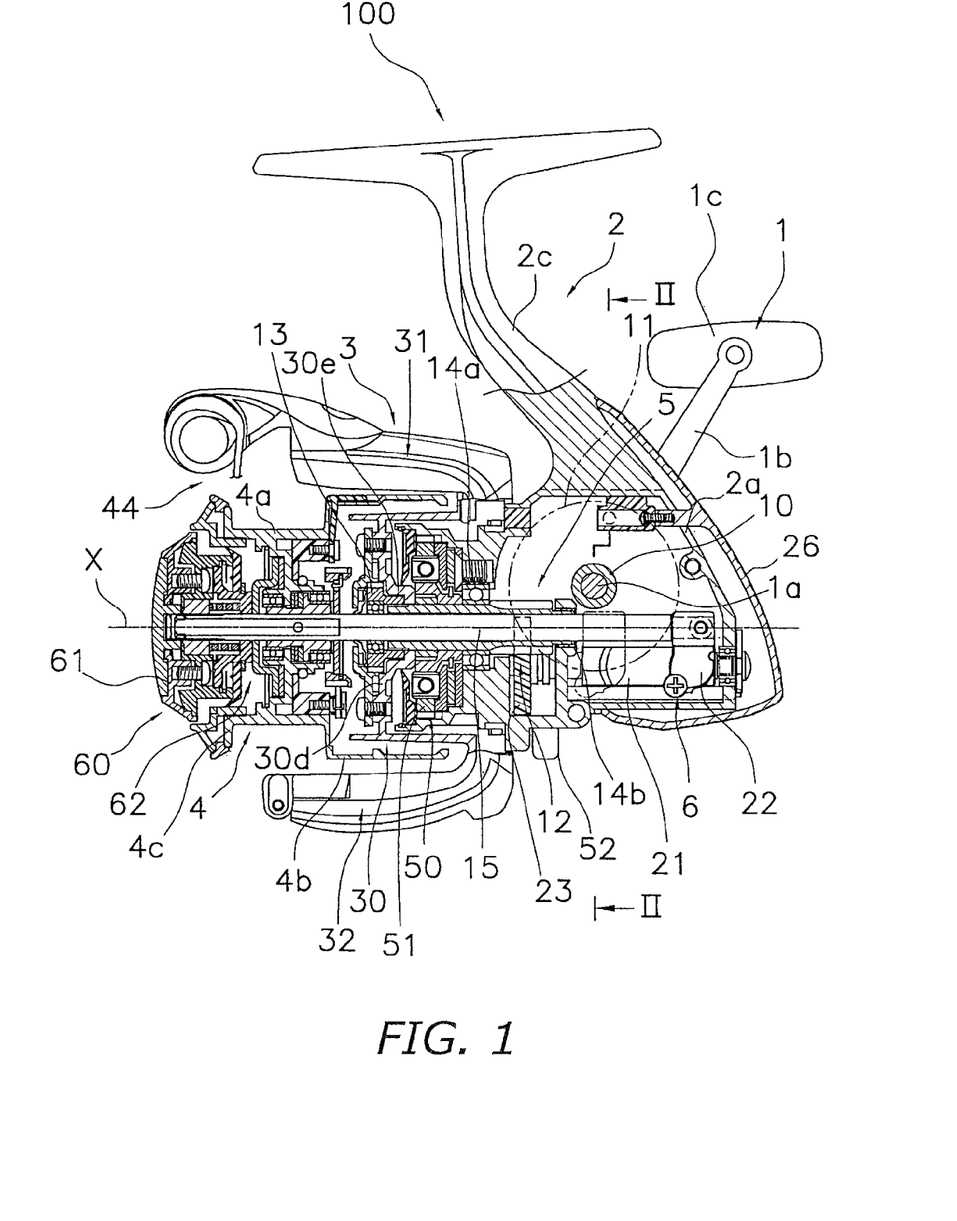
FIG. 1 is a cross-sectional side view of a spinning reel employing a first exemplary embodiment of the present invention.

As illustrated in FIG. 1, a spinning reel 100 (exemplary fishing reel) employing a first exemplary embodiment of the present invention includes a handle 1, a reel unit 2, a rotor 3, and a spool 4.

The reel unit 2 supports the handle 1 in a rotatable state. The rotor 3 is rotatably supported at the front of the reel unit 2. The spool 4 is configured to wind a fishing line onto the outer peripheral surface thereof. The spool 4 is disposed at the front of the rotor 3 while being movable back and forth. It should be noted that the handle 1 is attachable to either of the right side and the left side of the reel unit 2.

The handle 1 includes a handle shaft 1a, a handle arm 1b, and a handle knob 1c. The handle arm 1b extends from the handle shaft 1a in the radial direction of the handle shaft 1a. The handle knob 1c is rotatably mounted to the tip of the handle arm 1b.

Structure of Reel Unit

Figure 2:
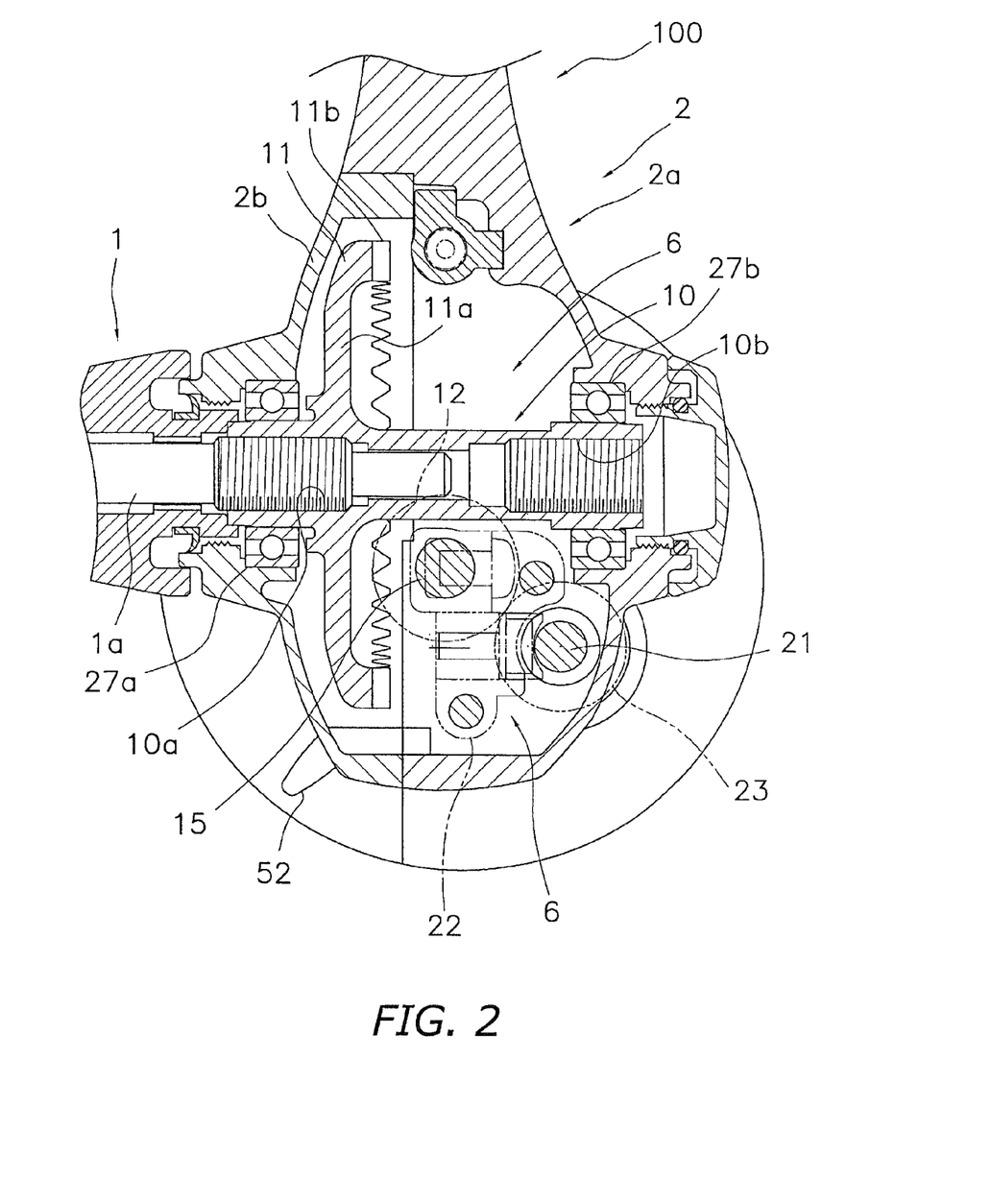
FIG. 2 is a cross-sectional rear view of the spinning reel of FIG. 1 taken along a line II-II.

As illustrated in FIG. 1, the reel unit 2 includes a reel body 2a and a lid member 2b (see FIG. 2). The reel body 2a has a laterally opened accommodation space in the inside thereof. The lid member 2b is detachably attached to the reel body 2a in order to close the opening of the accommodation space of the reel body 2a. Further, the reel unit 2 includes a reel unit guard 26 for covering the rear part of the reel body 2a and that of the lid member 2b.

The reel body 2a is made of, for instance, light metal alloy such as magnesium alloy or aluminum alloy. Further, the reel body 2a has a fishing rod attachment leg 2c integrally formed on the top thereof. The fishing rod attachment leg 2c is formed in a T-shape while the top thereof extends back and forth. As illustrated in FIG. 1, the reel body 2a accommodates a rotor drive mechanism 5 and an oscillation mechanism 6 in the accommodation space.

Structure of Rotor Drive Mechanism

Figure 3:
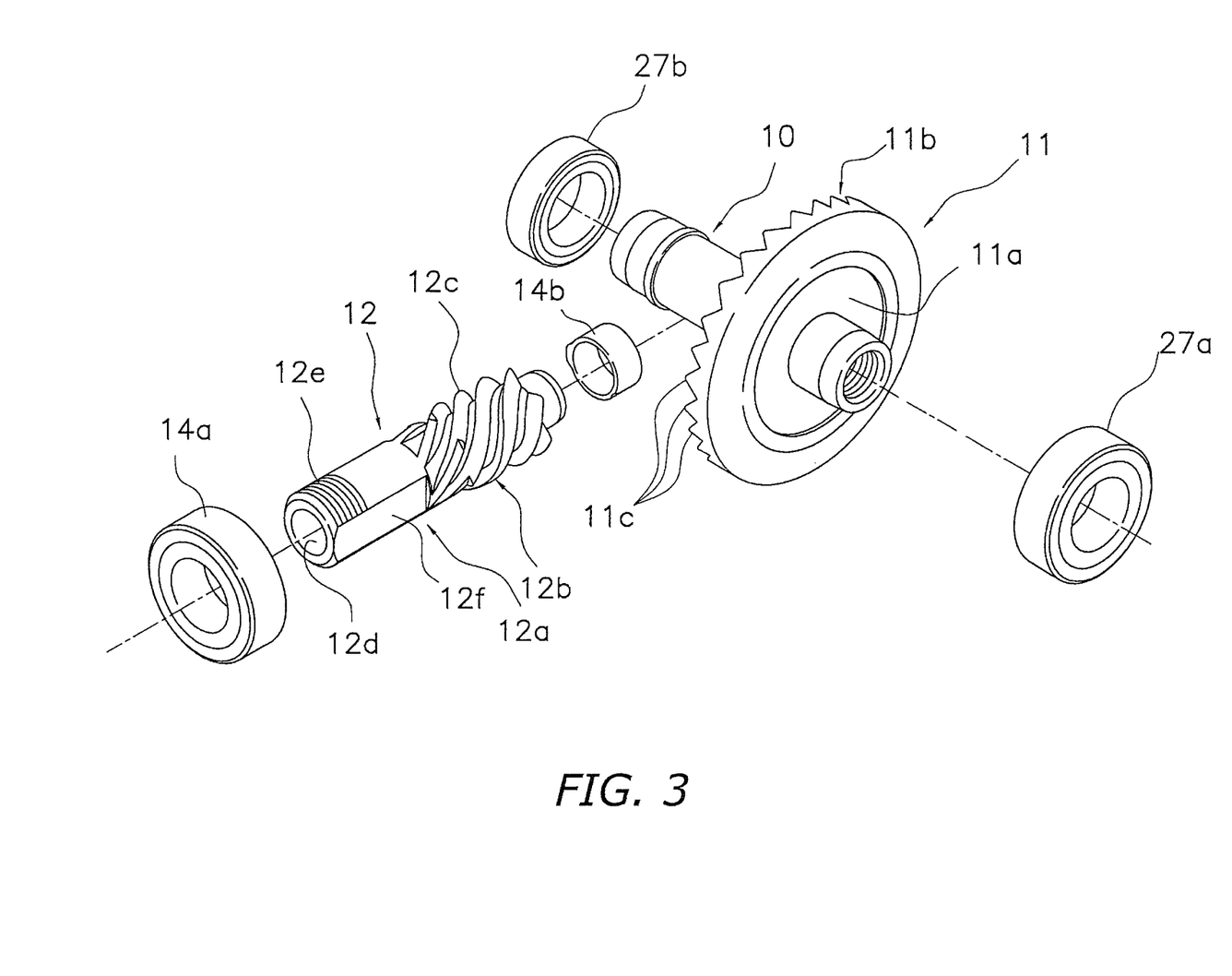
FIG. 3 is an exploded perspective view of a rotor drive mechanism.

The rotor drive mechanism 5 is configured to rotate the rotor 3 in conjunction with rotation of the handle 1 in order to transmit rotation of the handle 1 to the rotor 3. As illustrated in FIGS. 2 and 3, the rotor drive mechanism 5 includes a drive gear 11 and a pinion gear 12. The drive gear 11 is configured to be rotated with a drive shaft 10 to which the handle shaft 1a of the handle 1 is coupled in a unitarily rotatable state. The pinion gear 12 is meshed with the drive gear 11.

As illustrated in FIG. 2, the drive gear 11 is formed integrally with the drive shaft 10 in the present exemplary embodiment. However, the drive gear 11 can be alternatively formed separately from the drive shaft 10. The drive shaft 10 is screwed and coupled onto the handle shaft 1a in a unitarily rotatable state in the present exemplary embodiment. However, the drive shaft 10 can be alternatively coupled onto the handle shaft 1a in a unitarily rotatable state while a non-circular cross-sectional part of the drive shaft 10 is engaged with that of the handle shaft 1a. The drive shaft 10 is rotatably attached to the reel unit 2 through bearings 27a and 27b. The bearing 27a is attached to the lid member 2b, whereas the bearing 27b is attached to the reel body 2a. The drive shaft 10 has a left female threaded portion 10a and a right female threaded portion 10b on the inner peripheral surfaces of the both ends thereof. Either of the left female threaded portion 10a and the right female threaded portion 10b is allowed to be screwed onto the handle shaft 1a. In this case, the left female threaded portion 10a, which is disposed closer to the drive gear 11, is a left handed screw, whereas the right female threaded portion 10b, which is disposed away from the drive gear 11, is a right handed screw. Therefore, as the handle shaft 1a, two types of handle shafts are prepared to be used for the left handled screw and the right handled screw.

Figure 4:
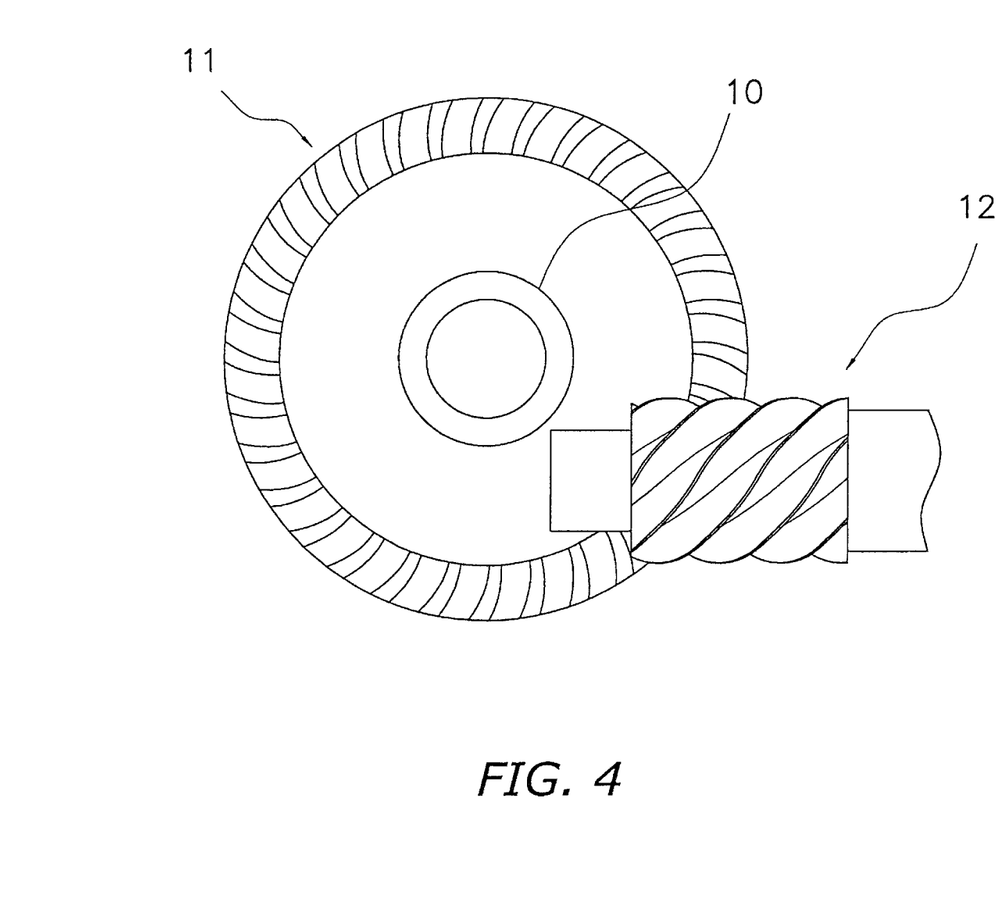
FIG. 4 is a plan view of the rotor drive mechanism.
Figure 5:
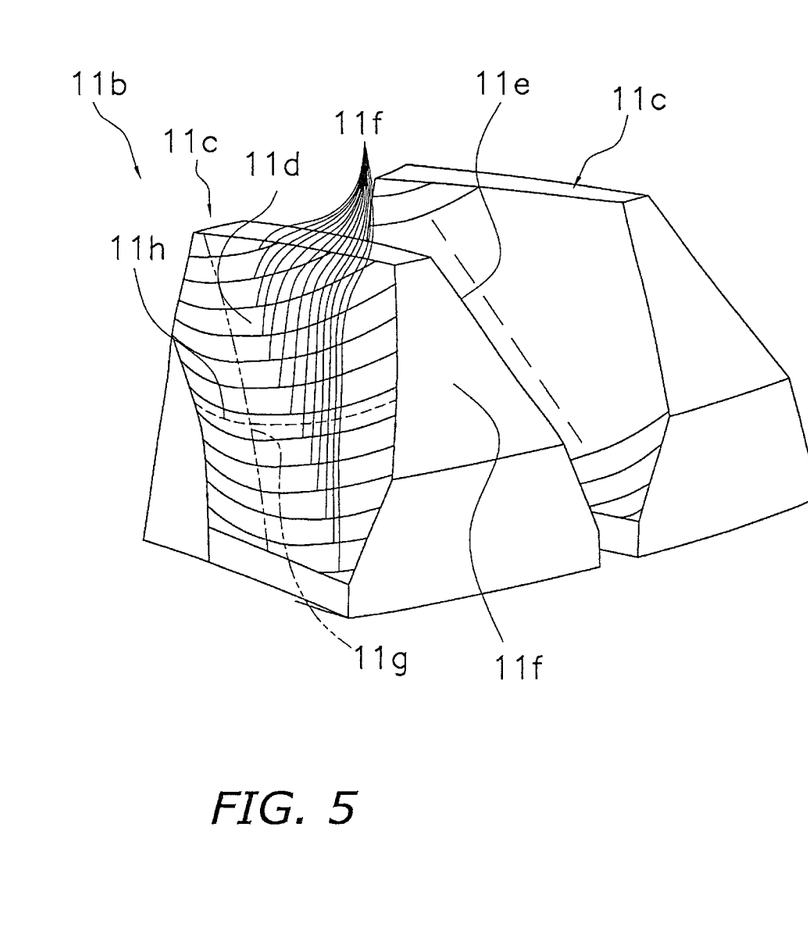
FIG. 5 is a schematic view of a face gear part of a drive gear.

As illustrated in FIGS. 2, 3 and 4, the drive gear 11 is of a face gear type. The drive gear 11 has a disc portion 11a and a gear tooth portion 11b. The disc portion 11a is integrally formed with the drive shaft 10. The gear tooth portion 11b is formed on the radially outer portion of one of the faces of the disc portion 11a. The gear tooth portion 11b has a plurality of face gear teeth 11c. The face gear teeth 11c are formed on the radially outer portion of the aforementioned face of the disc portion 11a while being circumferentially aligned at predetermined intervals. The drive gear 11, together with the drive shaft 10, is formed by forging of aluminum alloy, for instance. As illustrated in FIG. 5, each face gear tooth 11c has a first tooth surface 11d and a second tooth surface 11e. The first tooth surface 11d is configured to be meshed with the pinion gear 12 when the handle 1 is rotated in a fishing-line winding direction. The second tooth surface 11e is configured to be meshed with the pinion gear 12 when the handle 1 is rotated in a fishing-line releasing direction. The first tooth surface 11d is formed as a concave surface of which a center part in the tooth trace direction is recessed. On the other hand, the second tooth surface 11e is formed as a convex surface of which a center part in the tooth trace direction protrudes. At least the first tooth surface 11d has at least one groove 11f formed along a direction perpendicular to a mesh directional path 11g, specifically, along a simultaneous mesh contact line 11h. Here, the simultaneous mesh contact line 11h refers to a portion where the tooth tip of the pinion gear 12 linearly contacts the first tooth surface 11d of the face gear tooth 11c when the substantially entire length of the tooth width of the tooth tip of the pinion gear 12 simultaneously contacts the first tooth surface 11d of the drive gear 11. As illustrated by a broken line of FIG. 5, the simultaneous mesh contact line 11h is a line which has a shape similar to the groove 11f. When the drive gear 11 is rotated, the simultaneous mesh contact line 11h moves while sliding from the tooth base to the tooth tip side of the first tooth surface 11d of the drive gear 11, and the drive gear 11 rotates the pinion gear 12. The number of grooves 11f can be one. When the number of grooves 11f is plural, it is preferable to form seven to fifteen grooves 11f. Accordingly, apparent mesh frequency is multiplied by eight to sixteen times, and rotational feeling can be thereby enhanced.

In the first exemplary embodiment, a plurality of (e.g., 13) grooves 11f are formed at predetermined intervals in the direction of the mesh directional path 11g indicating the shift direction of the simultaneous mesh contact line. For example, each groove 11f has a groove width in a range of 25 μm to 100 μm and has a depth in a range of 10 μm to 50 μm. It should be noted that in forming the drive gear 11 by die forming, the grooves 11f are formed with a die.

For example, the specification of the drive gear 11 is set as follows: a teeth number of 31; an outer diameter of 25.9 mm; an inner diameter of 21.4 mm; and a reference offset of 6.5 mm.

The pinion gear 12 has a gear body 12a and a gear portion 12b. The gear body 12a has a tubular shape. The gear portion 12b has helical teeth 12c formed on the outer peripheral surface of the rear part of the gear body 12a. The gear body 12a is attached to the reel body 2a while being rotatable about an axis (i.e., a spool shaft 15) being different from the handle shaft 1a. The gear body 12a is rotatably supported by the reel body 2a through a front bearing 14a and a rear bearing 14b. The front bearing 14a is herein disposed forward of the gear portion 12b, whereas the rear bearing 14b is disposed rearward of the gear portion 12b. The gear body 12a has a through hole 12d in the center thereof for allowing the spool shaft 15 to penetrate therethrough. The gear body 12a has a male threaded portion 12e on the outer peripheral surface of the front end thereof. A nut 13 is screwed onto the male threaded portion 12e for fixing the rotor 3. The gear body 12a further has a pair of anti-rotation planes 12f on the outer peripheral surface of the front part thereof. The anti-rotation planes 12f are parallel planes used for coupling the rotor 3 onto the pinion gear 12 in a unitarily rotatable state. The drive gear 11 and the pinion gear 12 are designed to be meshed at a reference mesh height.

For example, the specification of the pinion gear 12 is set as follows: a module of 0.65 mm; a pressure angle of 20; a teeth number of 6; an addendum modification coefficient of +0.5; and a torsion angle of 55 degrees.

Structures of Other Components

As illustrated in FIGS. 1 and 2, the oscillation mechanism 6 is the one configured to move back and forth the spool shaft 15 coupled to the center part of the spool 4 through a drag mechanism 60 for moving the spool 4 in the same direction as the spool shaft 15. The oscillation mechanism 6 includes a traverse cam shaft 21, a slider 22 and an intermediate gear 23. The traverse cam shaft 21 is disposed below and in parallel to the spool shaft 15. The slider 22 is guided by the reel body 2a while being movable back and forth along the traverse cam shaft 21. The intermediate gear 23 is fixed to the tip of the traverse cam shaft 21. The rear end of the spool shaft 15 is fixed to the slider 22 in a non-rotatable state. The intermediate gear 23 is meshed with the pinion gear 12.

The rotor 3 is made of, for instance, light metal alloy such as magnesium alloy or aluminum alloy. As illustrated in FIG. 1, the rotor 3 is coupled to the pinion gear 12 in a non-rotatable state. However, the rotor 3 is rotatable with respect to the reel unit 2. The rotor 3 includes a tubular portion 30, a first rotor arm 31, and a second rotor arm 32. The tubular portion 30 is coupled to the pinion gear 12 in a unitarily rotatable state. The first and second rotor arms 31 and 32 are connected to the rear part of the tubular portion 30 while being opposed to each other. Each of the first and second rotor arms 31 and 32 forwardly extends at an interval from the tubular portion 30.

The tubular portion 30 has a disc-shaped wall portion 30d on the inner peripheral side of the front part thereof. The wall portion 30d has an annular boss 30e in the center part thereof.

The boss 30e is coupled to the pinion gear 12 in a unitarily rotatable state. The front part of the pinion gear 12 penetrates through the inner periphery of the boss 30e, while the anti-rotation planes 12f formed on the front part of the pinion gear 12 are fitted to the inner peripheral surface of the boss 30e in a unitarily rotatable state. Under the condition, the nut 13 is screwed onto the male threaded portion 12e of the pinion gear 12. The rotor 3 is thereby fixed to the pinion gear 12. A bail arm 44 is attached to the outer peripheral side of the tip of the first rotor arm 31 for leading the fishing line to the spool 4, while being pivotable between a fishing-line releasing position and a fishing-line winding position.

The rotor 3 accommodates an anti-reverse mechanism 50 in the inside of the tubular portion 30 thereof. The anti-reverse mechanism 50 is configured to prevent or allow reverse rotation of the rotor 3. The anti-reverse mechanism 50 includes a one-way clutch 51 and a switching lever 52. The one-way clutch 51 is of a roller-type one-way clutch that the inner race thereof is allowed to freely rotate. The switching lever 52 is configured to switch the one-way clutch 51 between an activated state (i.e., an anti-reverse rotational state) and a deactivated state (i.e., a reverse rotational state). The switching lever 52 is pivotably attached to the reel body 2a. A cam (not illustrated in the figures) is disposed on the tip of the switching lever 52. When the switching lever 52 is pivoted, the cam switches the one-way clutch 51 between the activated state and the deactivated state.

As illustrated in FIG. 1, the spool 4 is attached onto the tip of the spool shaft 15 through the drag mechanism 60, while being disposed between the first and second rotor arms 31 and 32 of the rotor 3. The spool 4 has a bobbin trunk 4a, a skirt 4b, and a flange 4c. The bobbin trunk 4a is a portion for winding the fishing line about the outer periphery thereof. The skirt 4b is a tubular portion extending rearwards from the bobbin trunk 4a. The skirt 4b is herein integrally formed with the bobbin trunk 4a. The flange 4c is a large diameter portion disposed on the front end of the bobbin trunk 4a.

The drag mechanism 60 is the one configured to brake rotation of the spool 4. The drag mechanism 60 includes a drag regulation knob 61 and a brake part 62. The drag regulation knob 61 is screwed onto the tip of the spool shaft 15. The brake part 62 is configured to brake the spool 4 when being pressed by the drag regulation knob 61.

Action of Spinning Reel

In the spinning reel 100 structured as described above, when an angler rotates the handle 1 in the fishing-line winding direction while the bail arm 44 is set to be in a fishing-line guide position after casting, the drive gear 11 is rotated in conjunction with rotation of the handle 1, and further, the pinion gear 12 meshed with the drive gear 11 is rotated. The rotor 3 is thereby rotated in the fishing-line winding direction, and the released fishing line is wound about the spool 4. At this time, the teeth of the pinion gear 12 make contact at their tips with the grooves 11f formed along the simultaneous mesh contact line. Therefore, in conjunction with rotation of the pinion gear 12, the drive gear 11 vibrates at a mesh frequency of (N+1) times as much as the mesh frequency where no groove is formed. The value (N+1) is herein obtained by adding 1 to the number N of the grooves 11f. In other words, apparent mesh frequency is multiplied by (N+1) times. Accordingly, an angular comes to recognize that the rotational feeling has been enhanced.

In this case, the grooves 11f are formed on the drive gear 11, and the apparent mesh frequency is thereby increased. Therefore, the rotational feeling of the drive gear 11 can be enhanced. In other words, the rotational feeling of the drive gear 11 can be enhanced without causing increase in diameter of the drive gear 11 and without causing degradation in strength of the drive gear 11.

Second Exemplary Embodiment

In the first exemplary embodiment, the present invention has been explained by exemplifying the drive gear 11 of a face gear type in the spinning reel 100 as an exemplary fishing reel. By contrast, in the second exemplary embodiment, as illustrated in FIG. 7, the present invention will be explained by exemplifying a drive gear 131 of a dual-bearing reel 200 as another exemplary fishing reel.

Figure 6:
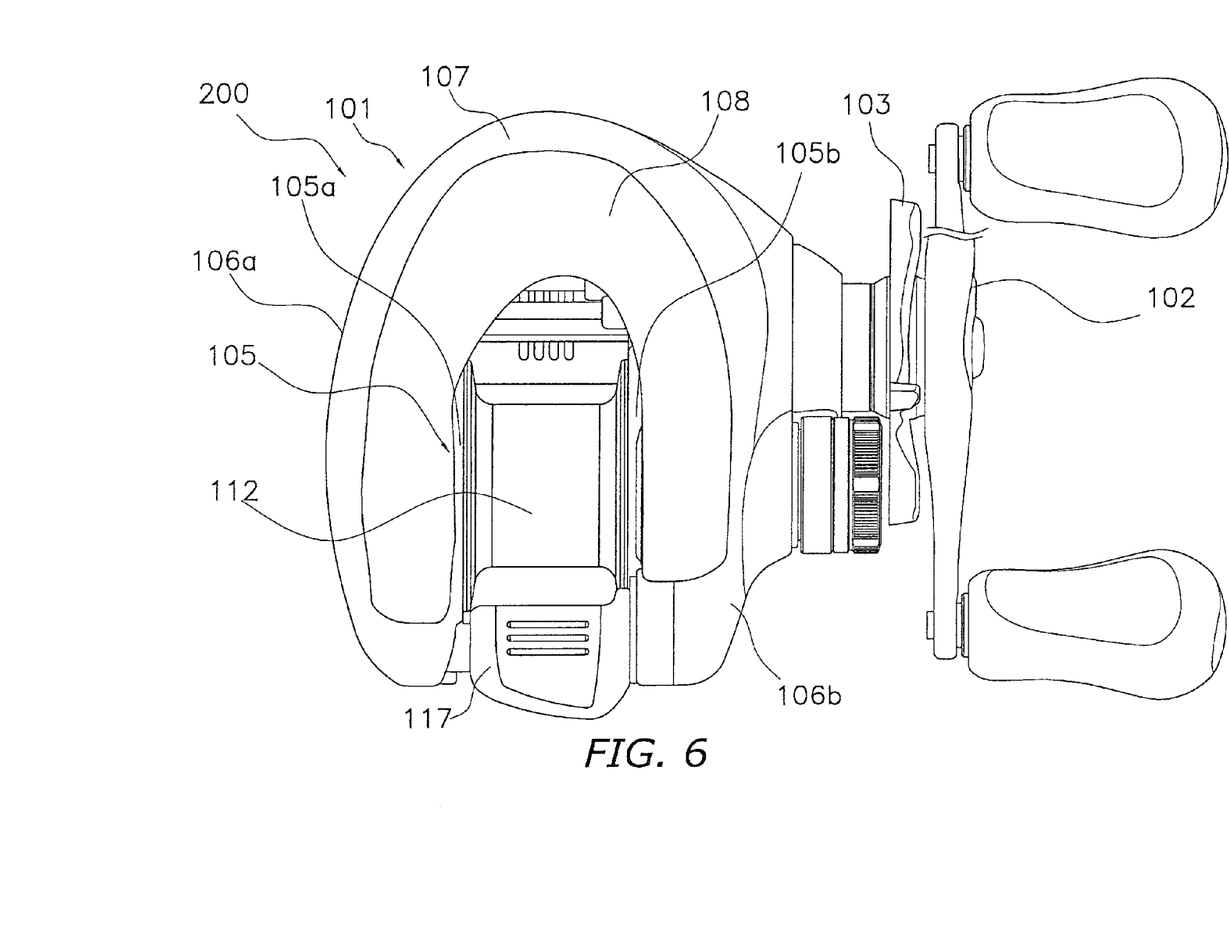
FIG. 6 is a plan view of a dual bearing reel employing a second exemplary embodiment of the present invention.
Figure 7:
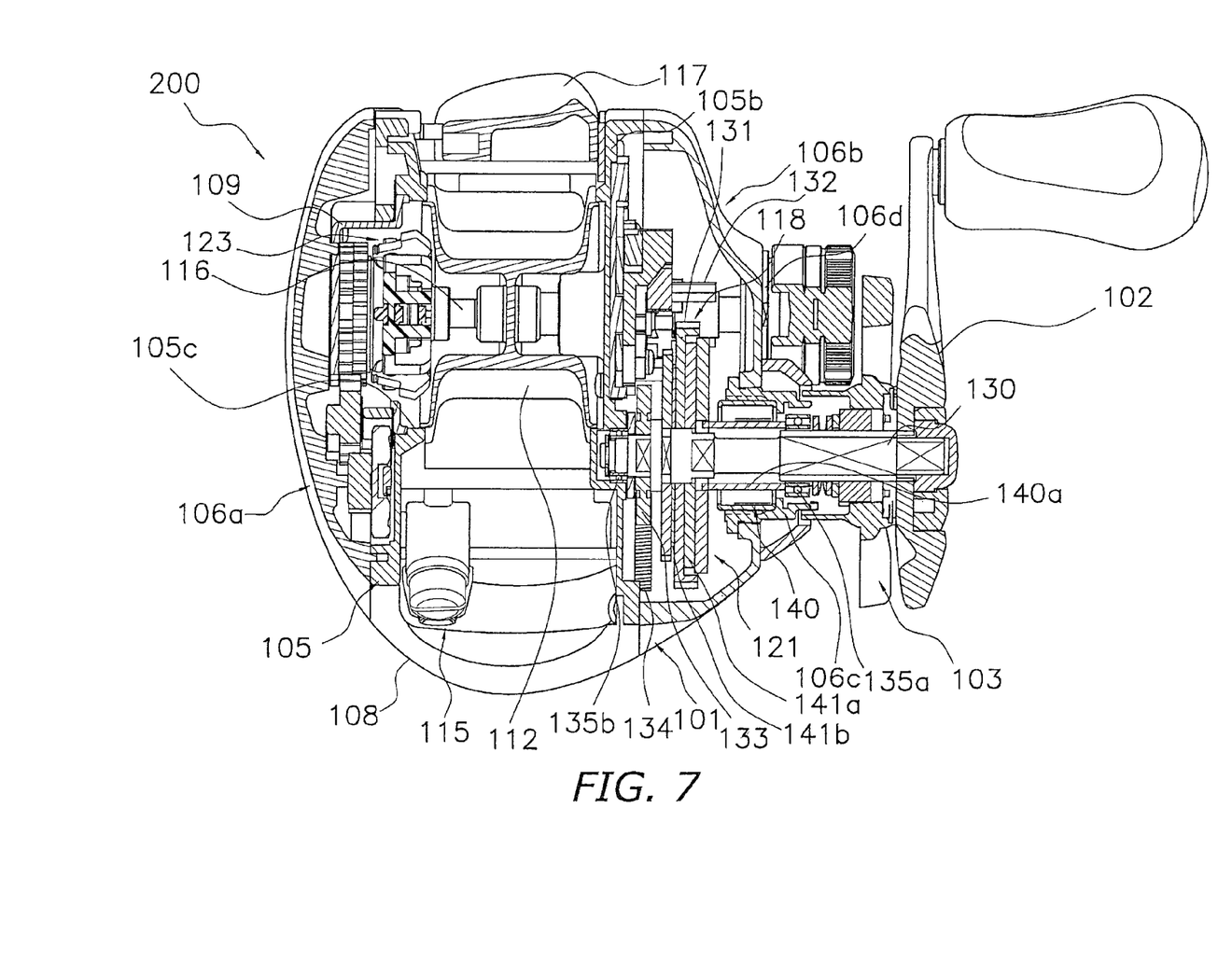
FIG. 7 is a cross-sectional plan view of the dual bearing reel according to the second exemplary embodiment.

As illustrated in FIGS. 6 and 7, the dual-bearing reel 200 employing the second exemplary embodiment of the present invention is a small-type low-profile bait-casting reel. The dual-bearing reel 200 includes a reel unit 101, a handle 102 for spool rotation and a star, drag 103 for drag regulation. The handle 102 is disposed laterally to the reel unit 101. The star drag 103 is disposed on the reel unit 101 side of the handle 102.

Reel Unit

The reel unit 101 includes a frame 105, a first side cover 106a, and a second side cover 106b. The first and second side covers 106a and 106b are attached to the both lateral sides of the frame 105. The reel unit 101 further includes a front cover 107 and a thumb rest 108. The front cover 107 covers the front side of the reel unit 101, whereas the thumb rest 108 covers the top side of the reel unit 101. As illustrated in FIG. 7, the reel unit 101 yet further includes a shaft support part 109 to be screwed to the first side cover 106a. A spool 112 is rotatably and detachably mounted inside the reel unit 101 for winding a fishing line.

The frame 105 includes a pair of a first side plate 105a and a second side plate 105b and a plurality of coupling portions (not illustrated in the figures). The first and second side plates 105a and 105b are disposed in opposition to each other at a predetermined interval. The coupling portions couple the first side plate 105a and the second side plate 105b. The first side plate 105a has a first opening 105c for allowing the spool 112 to pass therethrough.

The first side cover 106a is supported by the rear part of the first side plate 105a and that of the second side plate 105b while being rotatable and axially movable. The first side cover 106a can be opened and closed.

The front cover 107 and the thumb rest 108 (see FIG. 6) are screwed to the frame 105. The shaft support part 109 is a closed-end tubular member. The shaft support part 109 supports an end of a spool shaft 116.

The second side cover 106b is screwed to the second side plate 105b. The second side cover 106b has a first boss 106c and a second boss 106d. The first boss 106c is provided for supporting a drive shaft 130 (to be described) to which the handle 102 is coupled. The second boss 106d is provided for supporting the spool shaft 116 to which the spool 112 is fixed.

The spool 112, a level winding mechanism 115, and a clutch operating member 117 are disposed inside the frame 105. The level winding mechanism 115 serves to uniformly wind the fishing line about the spool 112. The clutch operating member 117 functions as a thumb pad in thumbing the fishing line. The spool 112 is allowed to pass through the first opening 105c of the first side plate 105a. Further, a gear mechanism 118, a clutch mechanism, a clutch control mechanism, a casting control mechanism (which are not illustrated in the figures), and a drag mechanism 121 are disposed between the frame 105 and the second side cover 106b. The gear mechanism 118 is configured to transmit rotational force from the handle 102 to the spool 112 and the level winding mechanism 115. The clutch control mechanism is configured to engage/disengage and control the clutch mechanism in response to an operation of the clutch operating member 117. The casting control mechanism is a brake mechanism for regulating resistive force to be produced in rotation of the spool 112. Further, a spool brake device 123 is disposed between the frame 105 and the first side cover 106a. The spool brake device 123 is configured to inhibit occurrence of backlash in casting.

The spool 112 is a member that the fishing line is wound about the outer periphery thereof. One end of the spool shaft 116 extends outside the second side cover 106b while penetrating through the second side plate 105b. The other end of the spool shaft 116 is supported by the second side cover 106b.

Gear Mechanism

Figure 8:
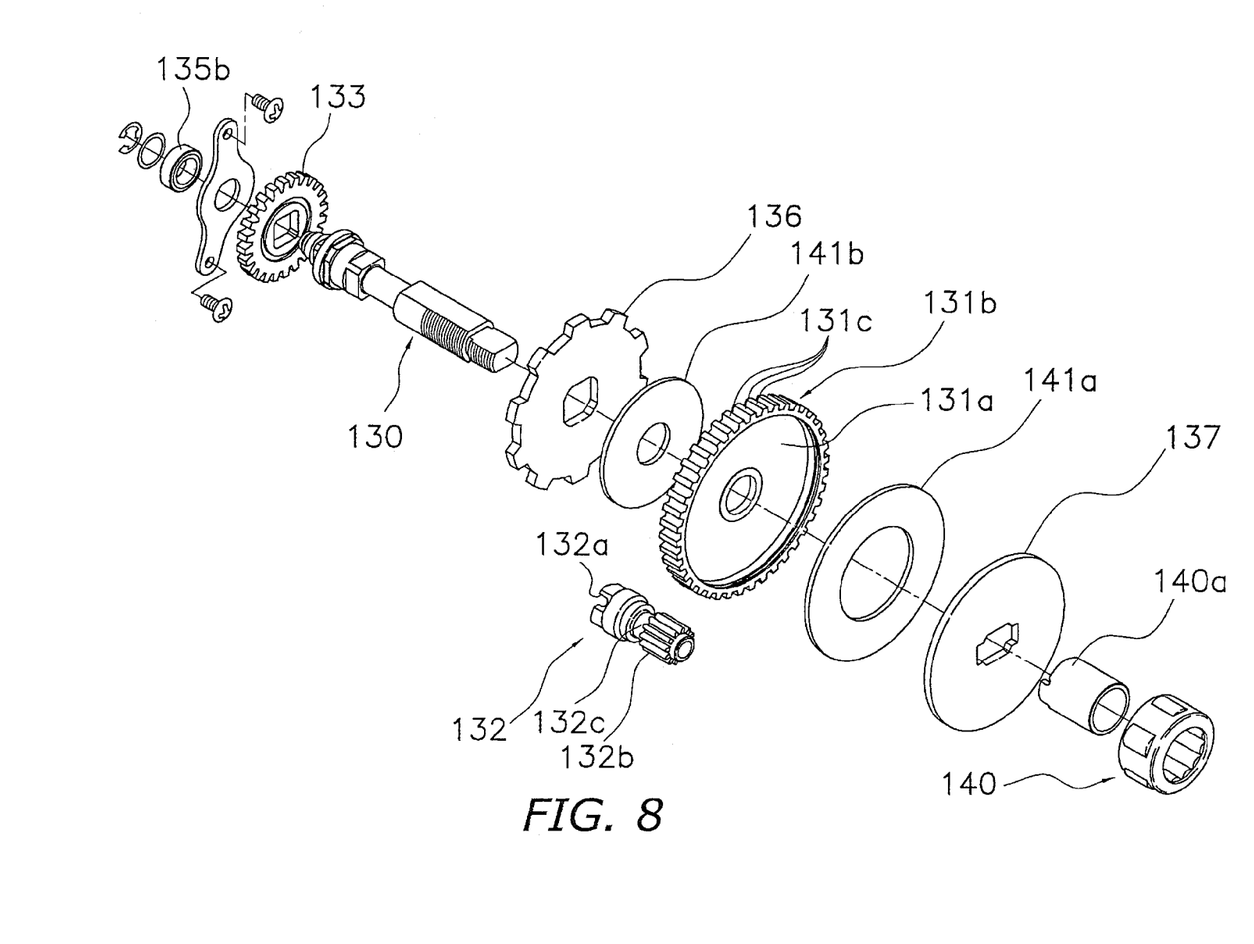
FIG. 8 is an exploded perspective view of a gear mechanism.

As illustrated in FIGS. 7 and 8, the gear mechanism 118 includes the drive shaft 130, the drive gear 131, a pinion gear 132 (see FIG. 8), a first gear 133, and a second gear 134. The handle 102 is coupled to the drive shaft 130 while being unitarily rotatable therewith. The drive gear 131 is attached to the drive shaft 130. The pinion gear 132 is meshed with the drive gear 131. The first gear 133 is coupled to the drive shaft 130 while being unitarily rotatable therewith. The second gear 134 is meshed with the first gear 133. The second gear 134 is provided for reciprocating right and left the level winding mechanism 115 in conjunction with rotation of the handle 102.

The drive shaft 130 is allowed to be rotated only in the fishing-line winding direction by a one-way clutch 140 attached to the first boss 106c of the reel unit 101. The drive shaft 130 is rotatably supported by the reel unit 101 through a first bearing 135a and a second bearing 135b. The first bearing 135a is attached to the first boss 106c of the second side cover 106b. The second bearing 135b is attached to the second side plate 105b.

A ratchet wheel 136, which functions as a drag receiver member for receiving drag force of the drag mechanism 121, is attached to the drive shaft 130 while being unitarily rotatable therewith. The ratchet wheel 136 functions not only as the drag receiver member but also as a clutch returning mechanism for returning the clutch mechanism from a clutch-off state to a clutch-on state.

Further, the drive gear 131 is rotatably attached to the drive shaft 130, while a drag plate 137 of the drag mechanism 121 is attached to the drive shaft 130 in a unitarily rotatable state. Yet further, the star drag 103 is screwed onto the drive shaft 130. The handle 102 is fixed to the drive shaft 130 while being unitarily rotatable therewith.

Figure 9:
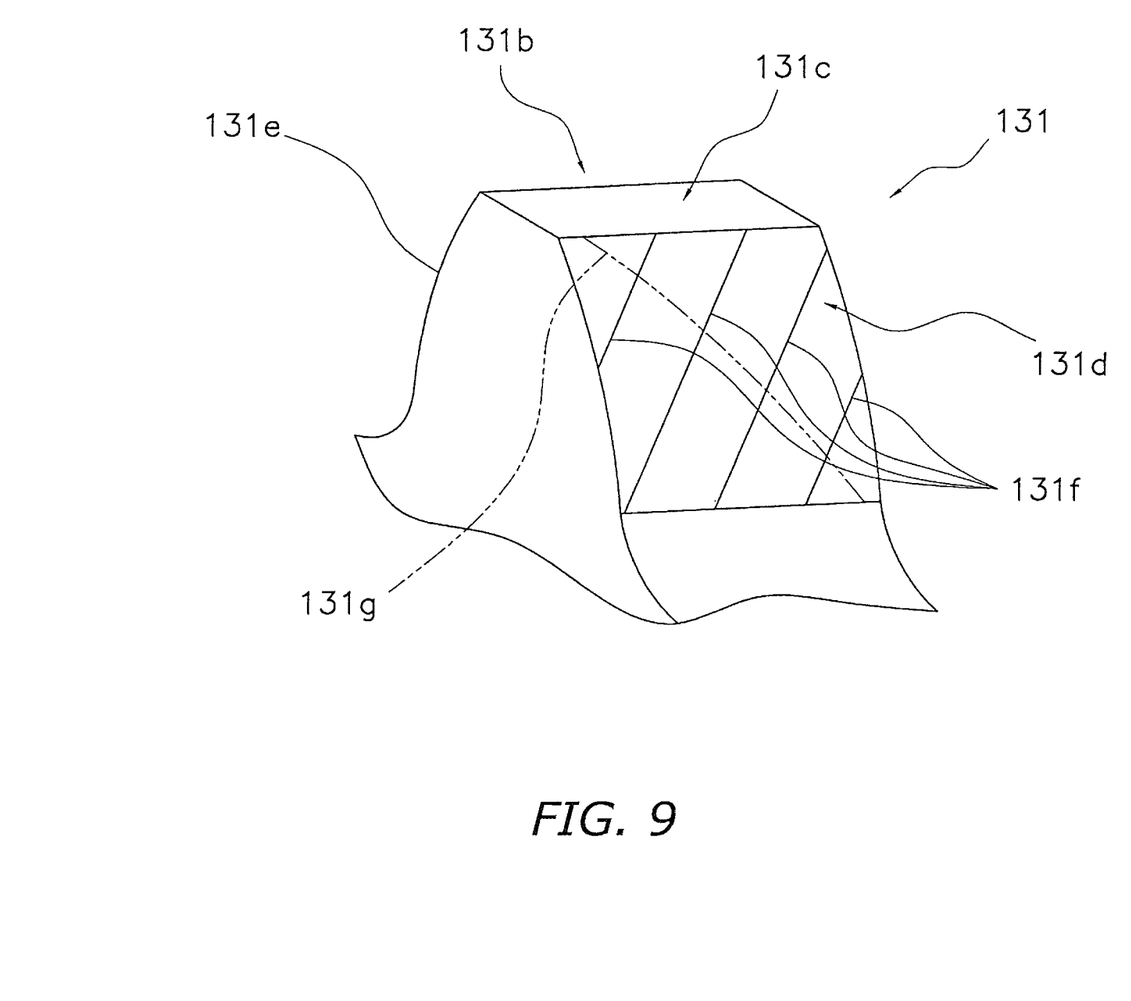
FIG. 9 is a schematic view of a gear tooth portion with helical teeth in the drive gear.

For example, the drive gear 131 is a cylindrical gear with a module of roughly 1 and a teeth number of roughly 42. Therefore, the pitch circle diameter is roughly 42 mm. In FIG. 8, the drive gear 131 is depicted as a gear with sour teeth for convenience of illustration. However, the drive gear 131 is actually produced as a cylindrical gear with helical teeth. The drive gear 131 has a disc portion 131a and a gear tooth portion 131b formed on the outer peripheral surface of the disc portion 131a. For example, the drive gear 131 is formed by gear cutting for stainless alloy. The gear tooth portion 131b has a plurality of gear teeth 131c circumferentially disposed at intervals. For example, the gear tooth portion 131b has helical teeth with a helix angle of 20 degrees or less. As illustrated in FIG. 9, each gear tooth 131c has a first tooth surface 131d and a second tooth surface 131e. The first tooth surface 131d is meshed with the pinion gear 132 when the handle 102 is rotated in the fishing-line winding direction. The second tooth surface 131e is meshed with the pinion gear 132 when the handle 102 is rotated in the fishing-line releasing direction. At least the first tooth surface 131d has at least one groove 131f formed along a simultaneous mesh contact line. The number of grooves 131f can be one. When the number of grooves 131f is plural, three to fifteen grooves 131f are preferably formed and aligned at intervals in a direction of a mesh directional path 131g. Accordingly, apparent mesh frequency is multiplied by four to sixteen times, and rotational feeling can be thereby enhanced.

In the second exemplary embodiment, a plurality of (e.g., four) grooves 131f are formed and aligned at intervals in the direction of the mesh directional path 131g intersecting with the simultaneous mesh contact line. Each groove 131f has a groove width in a range of 25 µm to 100 µm and has a depth in a range of 10 µm to 50 µm. The grooves 131f are formed by machining after gear cutting.

The pinion gear 132 is a tubular member that the spool shaft 116 penetrates through the center thereof. The pinion gear 132 is rotatably supported by the reel unit 101. Further, the pinion gear 132 is attached to the reel unit 101 while being movable in the spool shaft direction. As illustrated in FIG. 8, the pinion gear 132 has an engaged groove 132a on one end thereof. The engaged groove 132a is formed along the diameter of the pinion gear 132. The engaged groove 132a is engaged with an engaging pin (not illustrated in the figures). The pinion gear 132 has a gear portion 132b on the other end part thereof. The gear portion 132b is meshed with the drive gear 131. The pinion gear 132 has a narrowed portion 132c formed between the engaged groove 132a and the gear portion 132b. The clutch control mechanism is engaged with the narrowed portion 132c. When the clutch operating member 117 is operated and located in a clutch-off position, the pinion gear 132 is configured to be moved to an off-position located on the right side (i.e., the second side cover 106b side) of an on-position in FIG. 7. Accordingly, the clutch mechanism is set to be in the clutch-off state.

The second gear 134 is coupled to a warm shaft (not illustrated in the figures) of the level winding mechanism 115 while being unitarily rotatable therewith.

Drag Mechanism

In the clutch-on state, the drag mechanism 121 is configured to brake rotation of the spool 112 in the fishing-line releasing direction through the drive gear 131. Drag force of the drag mechanism 121 is regulated by the star drag 103. As illustrated in FIGS. 7 and 8, the drag mechanism 121 is configured to slip the drive gear 131 by transmitting the rotation of the handle 102 and the pressing force of the star drag 103 to the drive gear 131 through an inner race 140a of the one-way clutch 140. Rotation of the spool 112 is thereby braked in the fishing-line releasing direction. The drag mechanism 121 includes the ratchet wheel 136 and the drag plate 137 coupled to the inner race 140a in a unitarily rotatable state. To smoothly slip the drive gear 131 in drag actuation, a first drag washer 141a is attached between the drag plate 137 and the drive gear 131, while a second drag washer 141b is attached between the drive gear 131 and the ratchet wheel 136. The first and second drag washers 141a and 141b are made of either felt or graphite.

Action of Dual-Bearing Reel

Next, the action of the dual-bearing reel will be explained.

In releasing the fishing line, the clutch mechanism is switched into the clutch-off state by operating the clutch operating member 117. As a result, the spool 112 becomes freely rotatable. In casting, the spool 112 is rotated in the fishing-line releasing direction, and the fishing line with a terminal tackle attached to the tip thereof is released from the spool 112.

When the terminal tackle lands in water, the handle 102 is rotated in the fishing-line winding direction and the clutch mechanism is thereby switched into the on-state. Accordingly, the handle 102 and the spool 112 are coupled. When a fish is hooked by the terminal tackle, the handle 102 is rotated in the fishing-line winding direction. Accordingly, the rotation of the handle 102 is transmitted to the spool 112 from the drive gear 131 through the pinion gear 132. The spool 112 is thereby rotated in the fishing-line winding direction. At this time, when the handle 102 is rotated twice in a second, the apparent mesh frequency of the drive gear 131 rotating in the fishing-line winding direction will be 200 or greater in the one-way clutch 140 and the handle 102 vibrates at 200 Hz or greater. Therefore, even when amplitude is enlarged, an angler does not feel it uncomfortable. Thus, feeling for gear noise is inhibited and rotational feeling is enhanced.

Next, when the fishing line is released by pull of a fish or the like, rotation of the spool 112 is transmitted to the drive gear 131 and is further transmitted to the drive shaft 130 and the one-way clutch 140 through the drag mechanism 121. The one-way clutch 140 prevents reverse rotation of the drive shaft 130. When the fishing line is weakly pulled by a fish, the spool 112 is not rotated and therefore the fishing line is not released. When the fishing line is strongly pulled by a fish and the rotational force of the spool 112 is increased, the rotational force to be transmitted exceeds a set rotational resistive force of the drag mechanism 121. Accordingly, a slip occurs in the drag mechanism 121, and the spool 112 part including the drive gear 131 starts rotating. At this time, the drag mechanism 121 constantly applies predetermined resistive force, i.e., drag force to the spool 112.

Features

The aforementioned exemplary embodiments can be expressed as follows.

(A) The drive gear 11 (or 131) of the spinning reel 100 (or the dual-bearing reel 200) as a fishing reel is a drive gear to be used for a fishing reel. The drive gear 11 (or 131) has the gear tooth portion 11b (or 131b) and the disc portion 11a (or 131a). The gear tooth portion 11b (or 131b) has the face gear teeth 11c (or the gear teeth 131c), and each face gear tooth 11c (or each gear tooth 131c) has at least one groove 11f (or 131f), which is formed on the first tooth surface 11d (or 131d) thereof while extending along the direction intersecting with the mesh directional path 11g (or 131g). The disc portion 11a (or 131a) is a portion that the gear tooth portion 11b (or 131b) is formed on the radially outer portion of the lateral surface (or the outer peripheral surface) thereof.

In the drive gear 11 (or 131), at least one groove 11f (or 131f), which intersects with the mesh directional path 11g (or 131g), is formed on the first tooth surface 11d (or 131d) of each face gear tooth 11c (or the gear tooth 131c). Therefore, when the pinion gear 12 (or 132), which is arranged to be meshed with the drive gear 11 (or 131), is actually meshed with the drive gear 11 (or 131), the contact line of the tooth surface of the pinion gear 12 (or 132), i.e., the simultaneous mesh contact line inevitably moves across the groove/grooves 11f (or 131f). Similarly to meshing, vibrations are produced when each tooth surface of the pinion gear 12 (or 132) gets across the groove/grooves 11f (or 131f). Accordingly, virtual mesh frequency is increased with a multiple of a value obtained by adding 1 to the number of grooves 11f (or 131f). In this case, the virtual mesh frequency can be increased by forming the groove/grooves 11f (or 131f), intersecting with the mesh directional path 11g (131g), on each first tooth surface 11d (or 131d) of the drive gear 11 (or 131). Therefore, the rotational feeling of the drive gear 11 (or 131) can be enhanced without increase in diameter of the drive gear 11 (or 131) and without degradation in strength of the drive gear 11 (or 131).

(B) In the drive gear 11 (or 131), at least one groove 11f (or 131f) extends along the simultaneous mesh contact line. In this case, the gear to be meshed with the drive gear more reliably and easily makes contact with the groove/grooves due to the structure that the groove/grooves 11f (or 131f) extend(s) along the simultaneous mesh contact line.

(C) In the drive gear 11 (or 131), a plurality of grooves 11f (or 131f) are formed on each tooth surface while being disposed at intervals in the direction of the mesh directional path 11g (or 131g). In this case, virtual mesh frequency is increased with a multiple of a value obtained by adding 1 to the number of the grooves 11f (or 131f) due to the structure that the plural grooves 11f (or 131f) are formed at intervals along the mesh directional path. Therefore, rotational feeling can be further enhanced.

(D) The drive gear 11 has seven to fifteen grooves 11f formed on each first tooth surface 11d thereof.

(E) In the drive gear 11, the gear tooth portion 11b has the face gear teeth 11c formed on the radially outer portion of one lateral face of the disc portion 11a. In this case, it is possible to enhance the rotational feeling of the drive gear 11 as the face gear with the face gear teeth 11c for the spinning reel 100.

(F) In the drive gear 11, the groove/grooves 11f is/are curvedly formed on each first tooth surface 11d. In this case, because of its/their curved shape/shapes, the groove/grooves 11f can be formed along the simultaneous mesh contact line of the pinion gear 12 having the helical teeth to be meshed with the face gear teeth 11c.

(G) In the drive gear 131, the gear teeth 131c include the helical teeth formed on the outer peripheral surface of the disc portion 131a. In this case, it is possible to enhance the rotational feeling of the drive gear 131 as the cylindrical gear with helical teeth for the dual-baring reel 200.

Other Exemplary Embodiments

Exemplary embodiments of the present invention have been explained above. However, the present invention is not limited to the aforementioned exemplary embodiments, and a variety of changes can be made without departing from the scope of the present invention. Especially, the plural exemplary embodiments and modifications described in the present specification can be arbitrarily combined on an as-needed basis.

(a) In the first exemplary embodiment, the drive gear 11 is formed by die forming. However, the drive gear 11 can be formed by machining. In this case, the groove/grooves can be formed by machining, or alternatively, by stamping.

(b) In the second exemplary embodiment, the present invention has been explained by exemplifying a cylindrical gear with helical teeth. However, the present invention can be also applied to a cylindrical gear with either double helical teeth or spur teeth.

(c) In the present exemplary embodiment, the groove/grooves is/are entirely formed along the simultaneous mesh contact line. However, the present invention is not limited to the structure. The groove/grooves can be arbitrarily formed as long as it/they is/are formed to intersect with the mesh directional path. For example, the groove/grooves can be formed not entirely but partially along the simultaneous mesh contact line.

Figure 10:
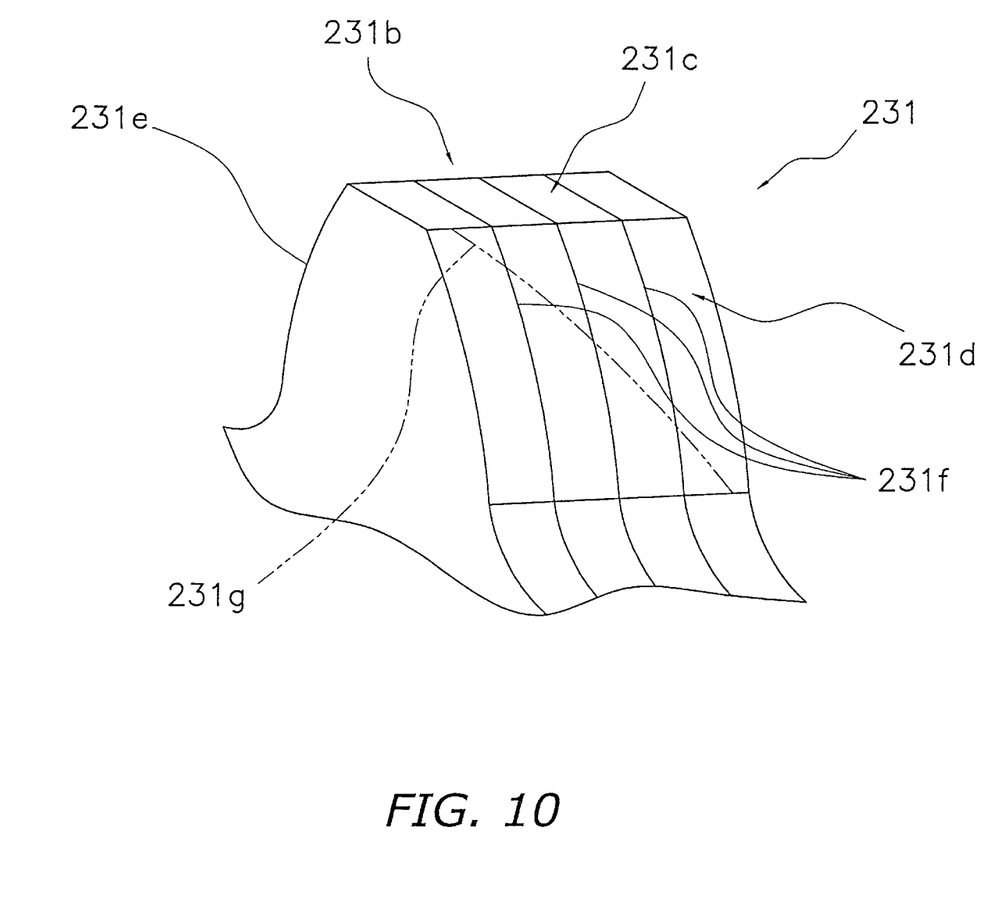
FIG. 10 is a diagram of a drive gear according to another exemplary embodiment and corresponds to FIG. 9.

Further, as illustrated in FIG. 10, a plurality of grooves 231f can be formed in a direction perpendicular to a tooth trace direction, while being aligned in parallel to each other at intervals in the tooth trace direction. Even in this case, the grooves 231f are formed while intersecting with a mesh directional path 231g. Such grooves 231f can be formed by machining. Alternatively, such grooves 231f can be formed by overlapping a plurality of metal plate blanks along the tooth flank direction, executing gear cutting with respect to the overlapped metal plate blanks, and disposing spacers among the post-gear cut metal plate blanks. In this case, the width of each groove can be adjusted. It should be noted that reference numerals assigned to components in FIG. 10 are expressed by adding 100 to those assigned to corresponding components in FIG. 9. Therefore, components except for the grooves 231f and the mesh directional path 231g are the same as those in FIG. 9, and the explanation thereof will be hereinafter omitted.

(d) In the aforementioned exemplary embodiments, the dual-bearing reel (including an electric reel) and the spinning reel are exemplified as a fishing reel. However, the present invention can be applied to the other fishing reels. For example, the present invention can be also applied to a spin cast reel including a drive gear and a single-bearing reel including a drive gear.

Advantageous Effects of Invention

According to the present invention, virtual mesh frequency can be increased by forming one or more grooves intersecting with a mesh directional path on either or both of the tooth surfaces of each gear tooth. Therefore, the rotational feeling of a drive gear can be enhanced without increase in diameter of the drive gear and without degradation in strength of the drive gear.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fishing reel drive gear for a fishing reel, the fishing reel drive gear being arranged to be meshed with a pinion gear, the fishing reel drive gear comprising:
   a gear tooth portion having first and second gear teeth, the first gear tooth including a first tooth surface, the second gear tooth including a second tooth surface, the first tooth surface including a first groove thereon, the second tooth surface including a second groove thereon, the first and second grooves intersecting with a mesh directional path; and
   a disc portion having an outer peripheral surface and a radially outer portion of a lateral face,
   the gear tooth portion being configured on the outer peripheral surface or the radially outer portion,
   the fishing reel drive gear being arranged to be meshed with the pinion gear in a direction of the mesh directional path.

2. The fishing reel drive gear according to claim 1, wherein the first groove extends along a simultaneous mesh contact line being a line at which the first tooth surface is linearly in contact with the pinion gear.

3. The fishing reel drive gear according to claim 1, wherein the first and second grooves are disposed at an interval in a direction of the mesh directional path.

4. The fishing reel drive gear according to claim 3, wherein the gear tooth portion includes third to fifteenth grooves formed on the first tooth surface.

5. The fishing reel drive gear according to claim 1, wherein the first gear teeth includes a face gear teeth formed on the radially outer portion of the lateral face of the disc portion.

6. The fishing reel drive gear according to claim 5, wherein the first groove is curvedly formed on the first tooth surface.

7. The fishing reel drive gear according to claim 1, wherein the first gear tooth is a spur tooth, a helical tooth, or a double helical tooth formed on the outer peripheral surface of the disc portion.

* * * * *